United States Patent [19]
Hoshi et al.

[11] Patent Number: 5,233,598
[45] Date of Patent: Aug. 3, 1993

[54] INFORMATION RECORDING MEDIUM HAVING A PLURALITY OF INFORMATION TRACKS ARRANGED IN A PREDETERMINED RECTILINEAR DIRECTION

[75] Inventors: Hiroaki Hoshi, Isehara; Kiyonobu Endo, Yokohama, both of Japan

[73] Assignee: Canon Kabushiki Kaisha, Tokyo, Japan

[21] Appl. No.: 726,734

[22] Filed: Jul. 2, 1991

Related U.S. Application Data

[63] Continuation of Ser. No. 453,165, Dec. 12, 1989, abandoned, which is a continuation of Ser. No. 940,531, Dec. 10, 1986, abandoned.

[30] Foreign Application Priority Data

| Dec. 11, 1985 | [JP] | Japan | 60-276697 |
| Dec. 11, 1985 | [JP] | Japan | 60-276700 |
| Dec. 13, 1985 | [JP] | Japan | 60-279334 |

[51] Int. Cl.⁵ .................. G06K 19/06; G11B 7/013
[52] U.S. Cl. ................... 369/275.3; 235/494; 235/454
[58] Field of Search ............ 235/454, 456, 462, 470, 235/487, 488, 494, 461, 471, 436; 369/275.3, 48, 59, 47, 54, 58, 44.26; 365/234; 358/342

[56] References Cited

U.S. PATENT DOCUMENTS

| 4,094,010 | 6/1978 | Pepperl et al. | 369/47 |
| 4,229,808 | 10/1980 | Hui | 365/234 |
| 4,254,329 | 3/1981 | Gokey et al. | 235/454 |
| 4,289,957 | 9/1981 | Neyroud et al. | 235/454 |
| 4,494,226 | 1/1985 | Hazel et al. | 369/54 |
| 4,534,031 | 8/1985 | Jewer | 369/97 |
| 4,562,577 | 12/1985 | Glover et al. | 369/54 |
| 4,634,850 | 1/1987 | Pierce et al. | 235/462 |
| 4,652,730 | 3/1987 | Marshall | 369/47 |
| 4,791,622 | 12/1988 | Clay et al. | 369/59 |
| 4,982,075 | 1/1991 | Aoki et al. | 235/494 |
| 4,982,077 | 1/1991 | Kawamura | 235/494 |

FOREIGN PATENT DOCUMENTS 0146257  6/1985  European Pat. Off.
61-82286  4/1986  Japan.

*Primary Examiner*—Robert A. Weinhardt
*Attorney, Agent, or Firm*—Fitzpatrick, Cella, Harper and Scinto

[57] ABSTRACT

In an information recording medium, there are provided with plural information track groups each provided with plural information tracks, and identification areas respectively formed in the plural information track groups and having codes respectively indicating the information track groups. An information reproducing process, for reproducing the information from the information reproducing medium, comprises the steps of detecting a code of the identification area indicating a desired information track group, and reproducing the information stored in the information track group, in response to the result of the detecting step.

16 Claims, 9 Drawing Sheets

INFORMATION RECORDING MEDIUM HAVING A PLURALITY OF INFORMATION TRACKS ARRANGED IN A PREDETERMINED RECTILINEAR DIRECTION

This application is a continuation of application Ser. No. 453,165 field Dec. 12, 1989, now abandoned, which is a continuation of application Ser. No. 940,531 filed Dec. 10, 1986, now abandoned.

BACKGROUND OF THE INVENTION

1. Field of the Invention

The present invention relates to an information recording medium and a process for reproducing the information therefrom, and more particularly to an information recording medium provided with a format capable of increasing the amount of information by reducing redundancy and capable of an improvement in the speed of access or reproduction, and a process for reproducing information from said medium for example in optical manner.

2. Related Background Art

In recent years reproduction of information utilizing optical information recording medium, such as an optical file or a compact disk, has become popular. More recently attention is being paid to the reproduction of information utilizing a card-shaped optical information recording medium, hereinafter called optical card, of superior portability and of a relatively large memory capacity.

FIG. 1 is a schematic plan view of an example of the recording format of an optical card.

An optical card 1 is provided with a recording area 2 in which plural bands 3 are arranged. In each band 3 there are arranged plural information tracks 4 each having a memory capacity of several ten to hundred bits. Each band is defined by reference lines 5. An arrow A indicates the moving direction of the optical card 1 in the information reproduction, while an arrow C indicates the scanning direction of an optical head for information reading at the reproduction of information.

FIG. 2 is a schematic view of an apparatus for reproducing the information from an optical card with the above-explained recording format.

The optical card 1 is reciprocated in a direction A by a rotary mechanism 6. The information recorded on the optical card 1 is read and reproduced, track by track, by an optical head 11. Light from a light source 7, such as a light-emitting diode, is concentrated by a lens system 8 and illuminates the optical card 1. The image of a track of said optical card 1 is imaged, by an imaging optical system 9, onto a linear sensor array 10. The image of the information track on the sensor array 10 varies with the movement of the optical card 1 in the direction A. The sensor array 10 scans several times while each information track is imaged on said sensor array. After the information of certain information tracks of a band is reproduced in this manner, the optical head 11 suitably moves in the direction C to image an information track of another desired band onto the sensor array and the recorded information is reproduced in the same manner.

FIG. 3 is a partial enlarged schematic view of the recording format of the optical card 1 shown in FIG. 1. In FIG. 3 a hatched area indicates signals "1" while a blank area indicates signals "0".

FIG. 3 illustrates an end portion of the recording area, in the direction A, of the optical card 1. In an information track area 201, an array of information bits in the direction C constitutes an information track. A reference line 202 and said information track area 201 constitute a band 203. The information track is composed of a group of unit data areas 204, each having 5 bits. The reference line 202 has a length of 6 bits in the direction C, of which two end bits are "0" while central four bits are "1" of a stripe shape with a narrower width than a bit length in the direction A, and each stripe is positioned corresponding to each information track.

The information reading from an information track with the sensor array 10 is initiated upon detection of the information "011110" of the reference line 202 signifying a proper alignment of the optical head with the information track. Then, with the movement of the optical card 1 in the direction A with respect to the optical head 11, the information "011110" of the reference line is erased and replaced by "000000". Thereafter, upon reception of the information "011110" again signifying another information track, a reading operation is conducted in the similar manner. In this manner the reference line 202 not only functions to separate and identify the tracks neighboring in the direction C, but also performs the same function for the tracks neighboring in the direction A.

For reproducing information over plural bands of an optical card of the above-explained format, the information tracks of each band are scanned by the movement of the optical head 11 in the direction C. In such operation, the position of the optical head 11 has to be controlled in such a manner that the image of the information track falls in the effective reading range of the sensor array 10 over the entire desired band 203. Said head position control can be achieved by positioning the reference line 202 of a desired band in a predetermined range of the sensor array 10.

On the other hand, for making access to a desired track on the optical card 1, the optical card 11 is moved in the direction C from a home position HP, and a band 3 to which the desired track belongs is selected by counting the number of the reference lines read by the optical head 11. Subsequently a track number area of the information track area 201 imaged on the sensor array 10 is reproduced by the movement of the optical card 1 in the direction A, and, upon detection of a track number of the desired track, the information of the data area of said track is reproduced.

Naturally the data recording area of such optical card should be as large as possible.

However, with the increase of the number of information tracks contained in a band, the number of bits of the track number area for track identification has to be increased, and such increase results in a decrease in the number of bits available in the data area and in a higher redundancy.

Besides the reproducing speed of such optical card should be as high as possible. Particularly in case the recorded information is image or acoustic information, a high reproducing speed is desirable since the minimum unit amount of such information often requires plural information tracks.

However, the above-mentioned increase in the number of bits in the track number area results in a decrease in the number of bits of the data area 204, thereby giving rise to an increase in the number of tracks required for recording the minimum unit amount of information and to a reduced speed of information reproduction.

Also as explained above, the reproducing speed of such optical card should be as high as possible, and such higher reproducing speed requires an efficient access to a desired track or band with the optical head.

SUMMARY OF THE INVENTION

In consideration of the foregoing, an object of the present invention is to provide an information recording medium with an increased amount of data information through the decrease of redundancy such as track numbers, and a process for reproducing information from such information recording medium.

Another object of the present invention is to provide an information recording medium allowing an improvement in the speed of access and reproduction and provided still with an increased amount of information, and a process for reproducing information from such information recording medium.

The foregoing objects can be achieved, according to the present invention, by an information recording medium, provided with plural information track groups each provided with plural information tracks, and identification areas respectively formed in said plural information track groups and having codes respectively indicating said information track groups.

Also the information reproducing process of the present invention, for reproducing the information from said information reproducing medium, comprises the steps of detecting a code of the identification area indicating a desired information track group, and reproducing the information stored in said information track group, in response to the result of said detecting step.

Usually said information track has an information array consisting of a one-dimensional array of bit patterns, and said bit pattern may be composed of a surface pit, a difference in direction of magnetization, difference in reflectance, transmittance or in the amount of charge.

The reproduction of information according to the present invention may be achieved in various methods, according to the mode of the bit pattern, for example optical, magnetic or electrical manner.

Said information tracks are usually arranged two-dimensionally. More specifically plural information tracks are arranged, in a direction substantially perpendicular to the direction of array of information, thus constituting a band, and a plurality of such bands is arranged in the direction of array of information in each information track to obtain a two-dimensional arrangement of the information tracks.

Such two-dimensional arrangement is suitable for use in case the information recording medium is an optical card. In such case said plural information tracks are arranged along the longitudinal and transversal directions of said card.

Other features of the present invention will be disclosed in the following embodiments. However the embodiment described in the present specification do not limit the present invention, but there can naturally be various forms of recording media and reproducing processes within the scope and spirit of the present invention.

DETAILED DESCRIPTION OF THE PREFERRED EMBODIMENTS

Now the present invention will be clarified in greater detail by embodiments thereof shown in the attached drawings.

Figure 4:
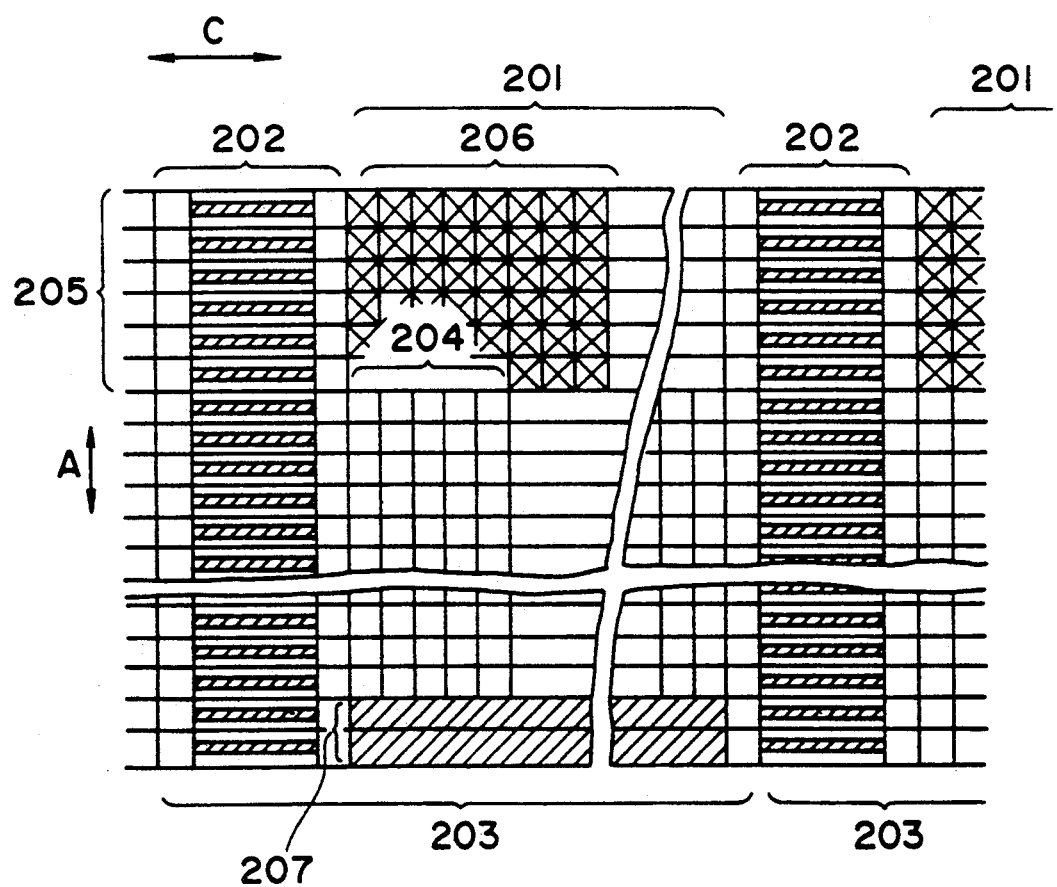
FIG. 4 is a schematic view of the recording format of an information recording medium of the present invention.

FIG. 4 is a partial enlarged schematic view of the recording format of an information recording medium embodying the present invention.

Figure 3:
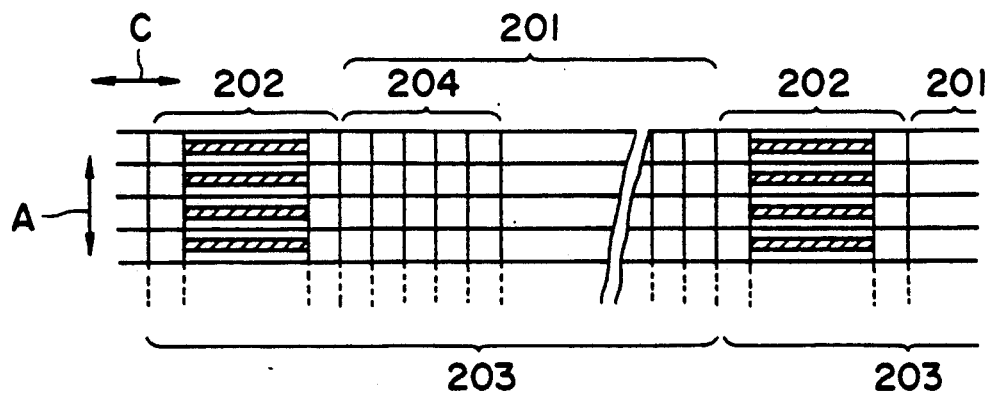
FIG. 3 is a partial enlarged view of a recording format of an information recording medium such as the optical card shown in FIG. 1.

In an information track area 201, an information track is composed of an array of information bits in a direction C. A unit data area 204 is composed of 5 bits, and an information track is composed of a group of such unit data areas. A separating area or a reference line 202 is formed, in the present embodiment, as shown in FIG. 3, in a position adjacent to the information track area 201 in the direction C. Said reference line 202 and the information track area 201 constitute a band 203.

Data stored in each 5-bit unit data area of the information track are subjected to a 4/5-conversion shown in the following table, followed by a NRZI modulation.

TABLE

| DATA | CODE MSB LSB |
|---|---|
| 0000 | 11001 |
| 0001 | 11011 |
| 0010 | 10010 |
| 0011 | 10011 |
| 0100 | 11101 |

TABLE -continued

| DATA | CODE MSB      LSB |
|------|-------------------|
| 0101 | 10101 |
| 0110 | 10110 |
| 0111 | 10111 |
| 1000 | 11010 |
| 1001 | 01001 |
| 1010 | 01010 |
| 1011 | 01011 |
| 1100 | 11110 |
| 1101 | 01101 |
| 1110 | 01110 |
| 1111 | 01111 |

Figure 5:
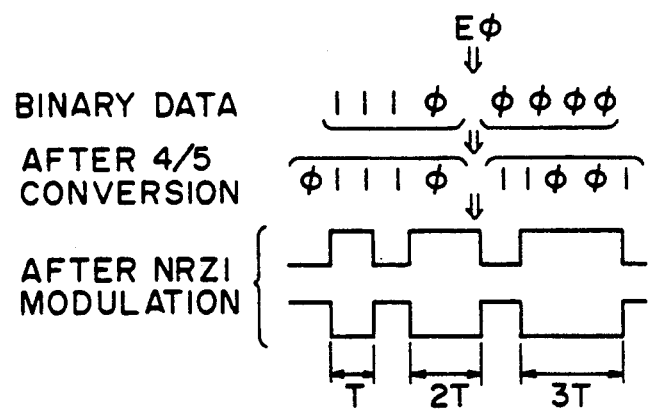
FIG. 5 is a schematic view showing a 4/5 NRZI modulation process.

FIG. 5 is a schematic view of 4/5 NRZI modulation employed in the present embodiment. Hexadecimal data Eφ are subjected at first to a 4/5-conversion and then to NRZI modulation, and the resulting signals only contains lengths of T, 2T and 3T, wherein T is the minimum inversion interval of the signal, corresponding to one bit in the recording format shown in FIG. 4. Thus the information recorded in the information track 201 does not contain an inversion interval of 4T or longer.

In the present embodiment, therefore, an area with an inversion interval of 4T is employed as a separating area, or a reference line, for separating and identifying the information tracks. As shown in FIG. 3, the reference line 202 has a length of 6 bits in the direction C, wherein two end bits are "0" while central four bits are "1" of a stripe shape with a width narrower (for example about ½) than a bit length in a direction A. In this manner there is formed an area of a separating signal "011110" having an inversion interval of 4T in the direction C. Naturally the separating area is not limited to such embodiment but can be any form identifiable upon reading.

Each information track has 16 unit data areas 204 with a total capacity of 80 bits, but is not provided with a preamble area for obtaining a self-clock signal at the information reproduction.

The presence of such consecutive same codes, which do not appear in the information track, in the separating area 202 ensures detection of the reference line. Also the absence of the preamble area for self-clocking, and the reduced number of bits required other than the recorded data allow to store a larger amount of data.

Figure 6:
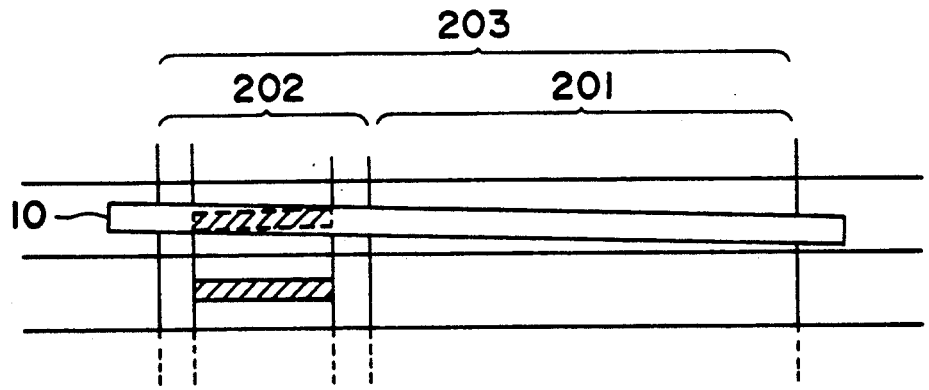
FIG. 6 is a schematic view showing the relationship between an information track and a sensor array.

Furthermore, in the present embodiment, since the central four bits "1" of the reference line 202 in the direction C have a narrower width than a bit length in the direction A, the entire sensor array 10 securely faces a same information track as long as the separating signal "011110" of the reference line 202 can be satisfactorily read on the sensor array 10, even if the sensor array 10 is not parallel to the information track as shown in FIG. 6.

In the present embodiment an area 205 for band identification is provided in the information track area 201, and the tracks in said identification area are provided with a band number area 206. The band identification area 205 is composed of plural tracks of which band number areas have a same number of said band in 8 bits each, marked by X in illustration. In the present embodiment, a part of the reference line 202 corresponding to the band identification area 205 is utilized as a head introduction area for controlling the optical head 11 in the direction C.

Also in the present embodiment, the band 203 is provided with a band end area 207 at an end opposite to said band identification area 205 in the direction A. Said end area is composed of two tracks filled with same information bits, for example "1", indicating the end of the arrangement of information tracks in the direction A.

Figure 7:
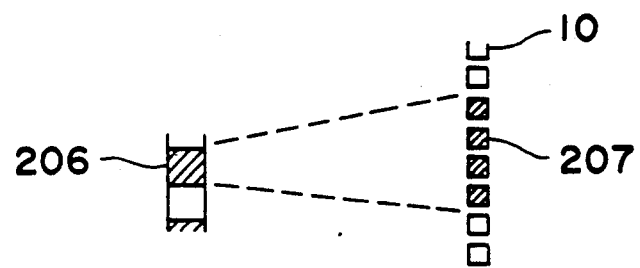
FIG. 7 is a schematic view showing the relationship between a sensor array and information recording bits of an information recording medium.

In the following there will be explained an embodiment of the process for information reproduction from said information recording medium, wherein employed are an optical card, as the information recording medium of the recording format shown in FIG. 4, and an apparatus shown in FIG. 2 for reproducing information from said optical card. In the present embodiment, the optical image magnification is so selected, as shown in FIG. 7, that a bit 206 of the recording area of the optical card is imaged on four cells 207 of the linear sensor array 10. In case a bit 206 of the optical card has a size of 10 μm while the cell 207 of the sensor array 10 has a size of 15 μm, the imaging optical system 9 should have an image magnification of 4×15/10=6 times.

Figure 8:
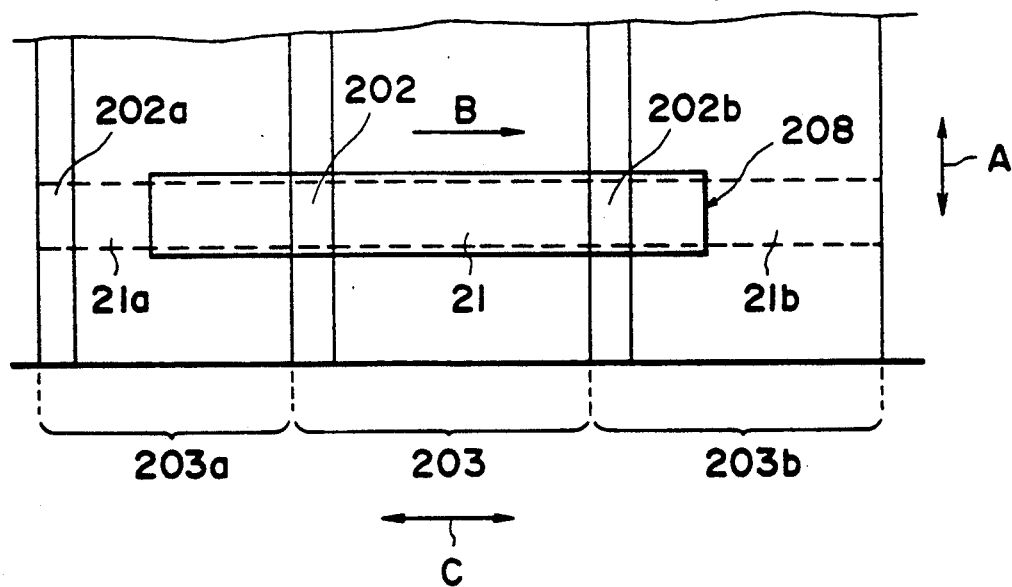
FIG. 8 is a schematic view showing a process for reproducing information from an information recording medium.

FIG. 8 is a schematic view showing the process of information reproduction from the information recording medium according to the present invention.

In FIG. 8, the recording area of the optical card is provided with a band 203, neighboring bands 203a, 203b, information tracks 21, 21a, 21b of said bands, and separating areas 202, 202a, 202b for separating said information tracks, arranged according to the above-explained format. Each information track of a band consists of a separating area of 6 bits and an information track of 80 bits, or a total of 86 bits, which are therefore imaged on 344 cells 207 of the sensor array 10.

The sensor array 10 is composed of a CCD having 512 cells, and a reading area 208 is so defined therein that a part of the neighboring tracks 21a, 21b are also imaged, in addition to the track 21, on the sensor array 10.

Such definition of the reading area 208 allows to obtain a clock signal at the information reproduction, without a preamble area for self clocking in the information track 21 to be read. More specifically, when the sensor array 10 scans the reading area 208 in the direction B, the reproducing clock signal is obtained for example from the information of a part of the information track 21a. Then, upon detection of the separating area 202, the information of the track 21 is reproduced by thus obtained clock signal, and said reproduction is terminated upon detection of the separating area 202b.

Also it is possible to know the relative position of the information track 21 and the reading area 208, from the signal of the separating area 202 on the linear sensor array.

Figure 9:
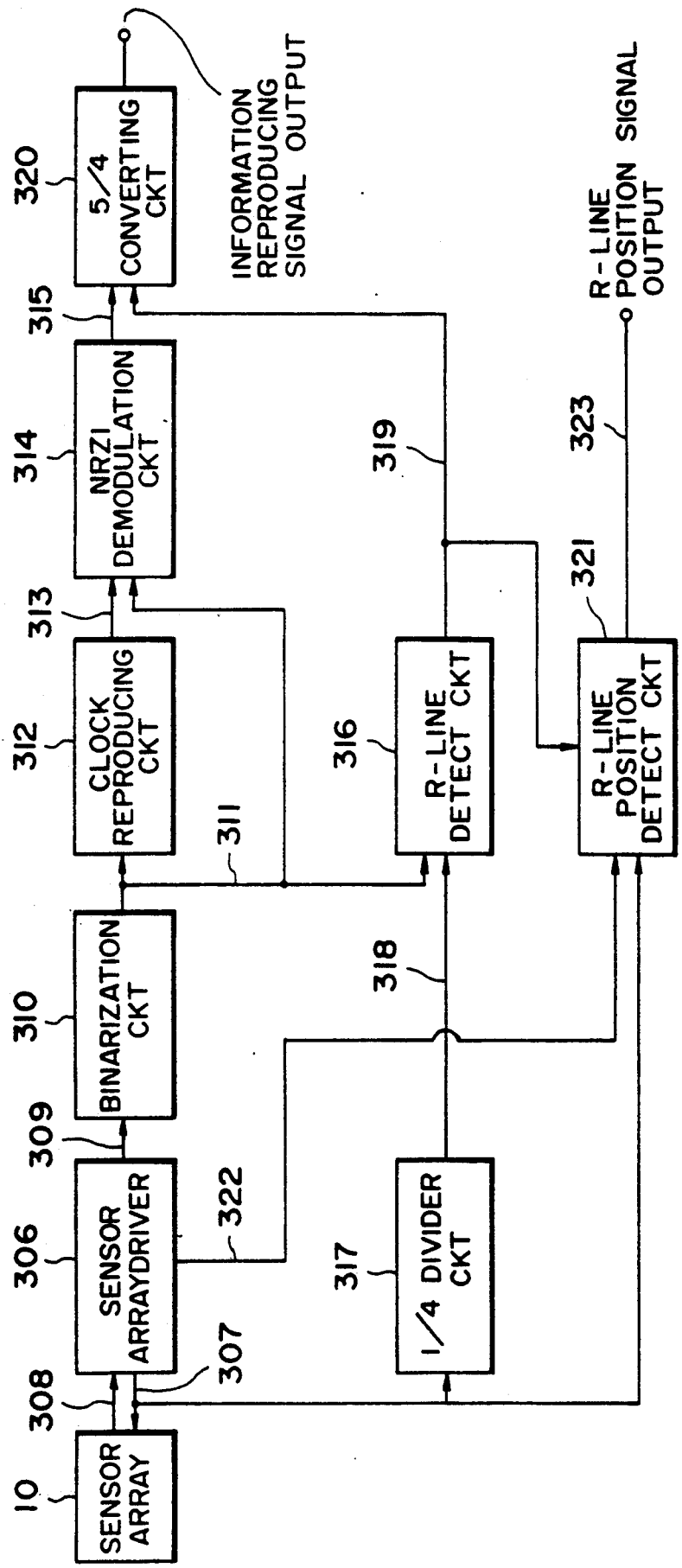
FIG. 9 is a block diagram of an apparatus for information reproduction from an information recording medium.

FIG. 9 is a block diagram showing an embodiment of the apparatus for reproducing information from the optical according to the present invention.

The sensor array 10 having the reading area 208 is driven by a driving clock signal 307 from a sensor array driver 306, and an output signal 308 of said sensor array is amplified by said driver 306 and supplied, as a video signal 309, to a binarizing circuit 310. The binarized video signal, or NRZI signal 311, from the binarizing circuit 310 is supplied to a clock reproducing circuit 312, a NRZI demodulating circuit 314 and a reference line detecting circuit 316.

The clock reproducing circuit 312 extracts a clock signal 313 from the NRZI signal 311, and supplies said clock signal to the NRZI demodulating circuit 314. In response to the clock signal 313 and the NRZI signal 311, the NRZI demodulating circuit 314 a demodulated NRZ signal 315 to a 5/4-conversion circuit 320. On the other hand, the reference line detecting circuit 316 receives a clock signal 318, obtained from a ¼ division circuit 317 by dividing the frequency of the driving clock signal 307, and the NRZI signal 311 from the binarizing circuit 310, and supplies a reference line detection signal 319 to the 5/4-conversion circuit 320, which, in response, effects the 5/4-conversion of the NRZ signal.

Also the reference line position detecting circuit 321 releases a reference line position signal 323, by counting the number of driving clock pulses 307 from the entry of a reading front end signal 322 from the sensor array driver 306 to the entry of the reference line detection signal 319.

Figure 10:
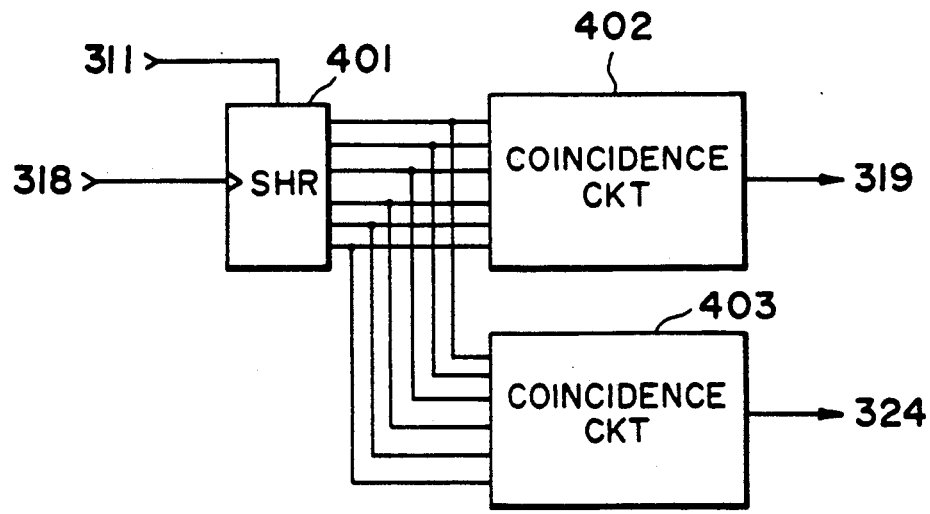
FIG. 10 is a block diagram of a reference line detecting circuit thereof.

FIG. 10 is a block diagram of said reference line detecting circuit 316, wherein a shift register 401 receives the NRZI 311 at a serial input terminal thereof, and the ¼-divided clock signal 318 at a clock input terminal. Parallel output terminals of 6 bits of said shift register 401 are respectively connected to the input terminals of a "011110" coincidence circuit 402, which supplies a coincidence signal, as the reference line detection signal 319, to the 5/4-conversion circuit 320. Said parallel output terminals are also connected to the input terminals of a "000000" coincidence circuit 403, releasing a coincidence signal 324.

The function of the above-explained reproducing apparatus will be explained in the following, with reference to FIGS. 4 and 8.

When the sensor array 10 scans the reading area 208 in the direction B in response to the driving clock signal 307, at first signals corresponding to the information of a part of the track 21a appear in the NRZI signal 311. Since said signals contain inversions intervals T, 2T and 3T only as explained before, the clock signal 313 can be reproduced by extracting the minimum inversion interval T with the clock reproducing circuit 312, composed for example of a PLL circuit. Said clock signal 313 is utilized in the demodulating circuit 314 for demodulating the NRZI circuit 311 to the NRZ signal 315. However the 5/4-conversion circuit 320 does not function until the entry of the first reference line detection signal 319. The shift register 401 of the reference line detection circuit 316 receives the bit signals of the reading area 208 in succession, and is always filled with signals of 6 bits. Thus the reference line detection signal 319 is not released unless the content of said shift register 401 coincides with the signal "011110" of the separating area 202 or 202b.

When the 6-bit signal "011110" of the first separating area 202 is stored in the shift register 401, the coincidence circuit 402 releases the reference line detection signal 319, whereby the 5/4-conversion circuit 320 initiates the conversion. In this manner the NRZ signal 315 corresponding to the information of the read information track 21 is subjected to the 5/4-conversion, and released as a reproduced signal.

Then, in response to the entry of the signal "011110" of the next separating area 202b into the shift register 401, the coincidence circuit 402 releases the reference line detection signal 319, whereby the 5/4-conversion circuit 320 terminates the release of the reproduced signal.

The reproduction of information from the read information track 21 is conducted by self clocking in this manner. Then another desired information track is selected for reading by a movement of the optical card in the direction A and/or a movement of the optical head 11, carrying the sensor array 10, in the direction C, and the information of said track is reproduced in the same manner.

However, since the movement of the sensor array 10 is not synchronized with the relative movement of the optical card to the sensor array 10, an information track may be scanned plural times, depending the scanning speed of the sensor array 10 in the direction B and the moving speed of the optical card in the direction A. For example, when the sensor array 10 with 512 cells is driven with a driving clock signal 307 of a frequency $F=10$ MHz, while an optical card with a bit size $L=10$ $\mu$m is moved with a speed $V=40$ mm/sec, each information track is scanned by:

$$S = L/V \times 1/(1/F \times 512) = 4.88 \ times.$$

Consequently it is necessary to detect the movement of the optical card to a next information track, and said detection can be achieved in the following manner. The coincidence circuit 403 releases the coincidence signal 324 upon detection of the signal "000000" of the separating area 202 or 202b, and the transfer to a new track can be detected by detection of the reference line detection signal 319, after the detection of said coincidence signal 324 from the coincidence circuit 403.

Figure 11:
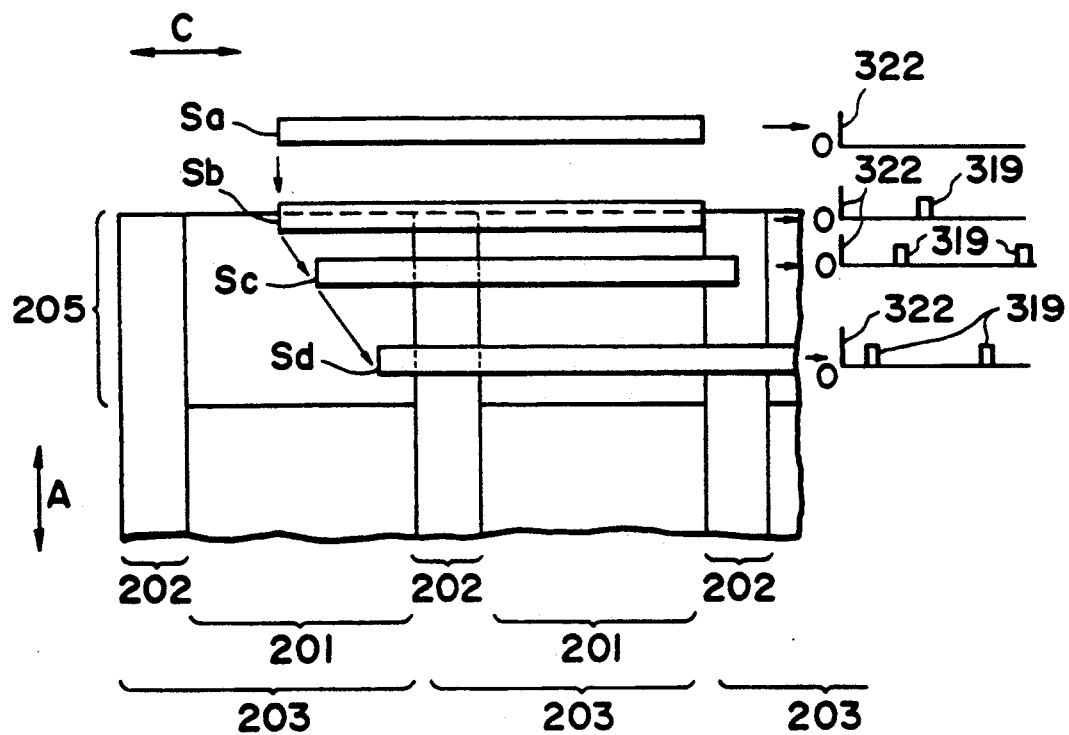
FIG. 11 is a schematic view showing a change in the imaging area on a sensor array in the information reproduction from the information recording medium of the present invention, and a resulting change in the output of said sensor array.

Now reference is made to FIG. 11 for explaining a control process for properly the image of the information track onto the linear sensor array 10.

It is assumed that, at first, an area Sa of the optical card is imaged on the sensor array, which releases a front end signal 322 only in this state, as shown at the right-hand side of the drawing. Then, when an area Sb is imaged on the sensor array by the movement of the optical card in the direction A, the reference line detection signal 319 appears in the output signal. Thus the reference line position detecting circuit 321 counts the number of driving clock pulses between the front end signal 322 and the reference line detection signal 319, and releases the reference line position signal 323 indicating the relative image position of the information track on the sensor array. In response to said signal 323, the optical head is controlled in the direction C in such a manner that areas Sc, Sd of the optical card are imaged in succession on the sensor array as the optical card is moved in the direction A. In this manner the sensor array can be properly positioned, and reproduces a band number recorded in the band number area 206 of a track provided with the band identification area 205. If said band number is a desired number, the optical card is moved further in the direction A to reproduce the information of the information track area 201. On the other hand, if said band number is not the desired one, the optical head can be immediately controlled for access to the desired band, without the unnecessary reproduction of undesired band, so that the time required for access can be reduced. Also immediately after the reproduction of information of a band, the band end area 207 is detected, and the access time can be reduced by making access to a next desired band immediately after said detection.

In the foregoing embodiment a band number is reproduced after the positioning of the optical head in the direction C, but it is also possible, in the present invention, to reproduce the band number immediately when the optical head reaches a position corresponding to the band identification area 205 of each band, and the access time can be further reduced in this manner.

More specifically, the above-explained access to a particular band is conducted in the following manner. A reproducing apparatus as shown in FIG. 2 receives, through an input device, a number of band in which the information to be reproduced is stored, or an information corresponding to said band number. A control device of said reproducing apparatus remembers a signal corresponding to said band number, and compares the same with a signal corresponding to a band number reproduced from the aforementioned band number area 206, and, in case of coincidence of both signals, proceeds to the reproduction of the information stored in said band.

In the following there is explained an alternative process of access, wherein a directory area is formed in a part of the recording area of the information recording medium of the format shown in FIG. 4, and the band numbers of the bands constituting the recording area, positions thereof in said area, contents of stored information etc. are recorded in said directory area.

Figure 2:
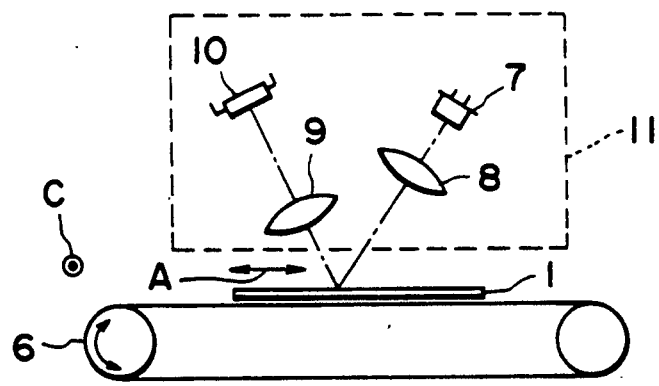
FIG. 2 is a schematic view of an apparatus for reproducing information from an information recording medium such as the optical card shown in FIG. 1.

On the other hand, the reproducing apparatus shown in FIG. 2 is electrically linked with an input device and a display device to constitute a system of signal communication among the constituent units.

At first the operator enters a start signal, through the input device, to the reproducing apparatus, which in response executes an access of the optical head to the directory area. The optical head reproduces the information recorded in said directory area and transmits said information to the display unit.

The display unit displays the information such as the content of information in the recording medium or in each band, recorded in said directory area.

Then the operator selects a particular band, containing desired information, for example through a console, and a signal entered through said console is supplied to the reproducing apparatus, for designating a band number. The reproducing apparatus moles the optical head to a band position corresponding to said signal, and reproduces the information of said band by a process as explained in the foregoing embodiment.

In the foregoing embodiment the band number area 206 of each track in the band identification area 205 consists of first 8 bits, but the present invention is not limited to such embodiment and can employ any number of bits capable of identifying all the bands. Also the band number area need not be positioned at the start position of each track but can be placed in any position therein. Furthermore same numbers may be periodically positioned in a track.

Furthermore the band number areas 206 are provided in all the tracks in the band identification area 205, and the presence of such band number areas in consecutive plural tracks is desirable for achieving securer detection, but the present invention is not limited to such structure.

Furthermore the foregoing embodiment has the band end area 207 consisting of two tracks having same information bits "1" over the entire tracks, but the structure of the band end area is naturally not limited to such embodiment, and any number of bits in a track, any bit arrangement, any cycle thereof, any number of tracks etc. may be conveniently utilized as long as the end of a band can be accurately and rapidly detected.

Though the foregoing embodiment employs a 4/5 NRZI modulation, any self-clocking modulation requiring an area for obtaining reproducing clock signal such as MFM or EFM modulation can be likewise employed. Also a preamble area for obtaining the reproducing clock signal may be provided in the track.

Also the neighboring area utilizing for obtaining the reproducing clock signal may naturally be an entire neighboring track, or an area covering plural bands.

Furthermore the foregoing embodiment is applicable, as explained before, to a magnetooptical recording medium in which the recording is achieved by inversion of direction of magnetization, or a recording medium utilizing surface pits.

The information recording medium of the recording format shown in FIG. 4 has plural bands each formed with plural information tracks, recording particular information or a minimum unit of information in said bands, and band identification areas in predetermined positions of said bands. Such structure allows to reduce or dispense with the track number areas conventionally required in respective tracks, thereby reducing the redundancy of such information in the recording area and increasing the amount of data information.

Also as explained above, the number of tracks constituting the minimum unit of information is reduced to increase the reproducing speed.

Figure 12:
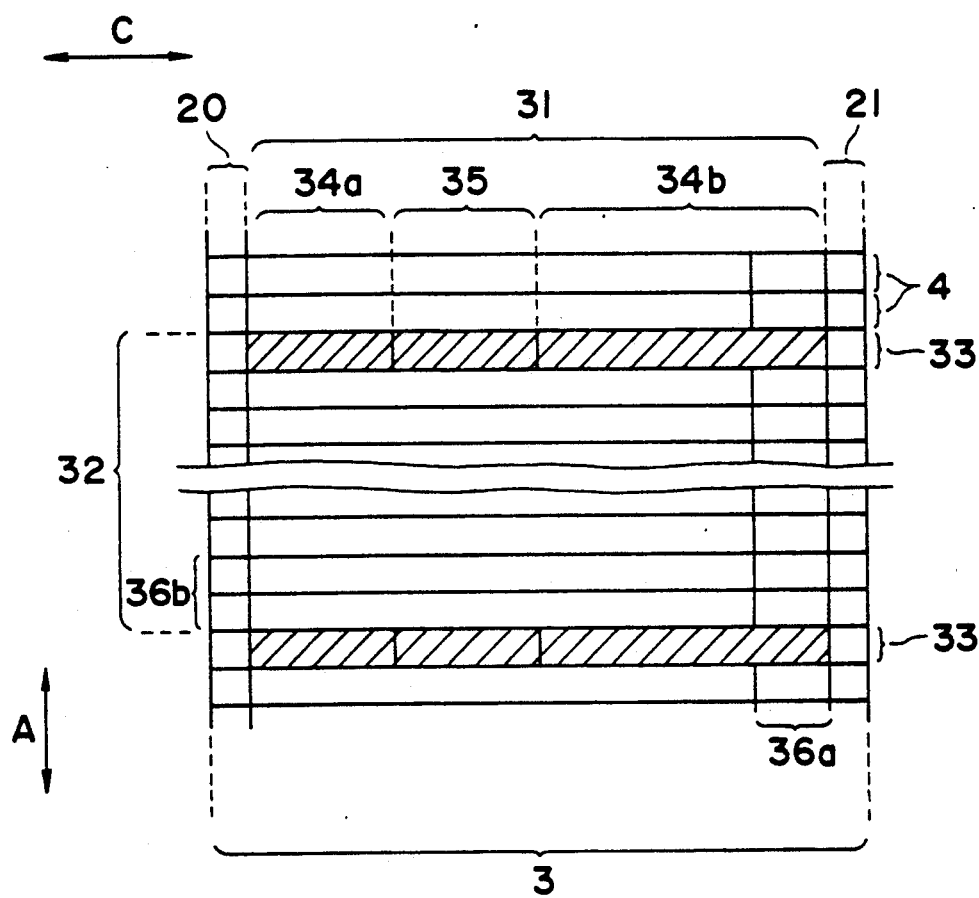
FIG. 12 is a partial enlarged view of the recording format, constituting another embodiment of the information recording medium of the present invention.

FIG. 12 is a partial enlarged view of the recording format, constituting another embodiment of the information recording medium of the present invention, wherein an information track 4 is composed of an array of information bits arranged in a direction C. Each information track 4 is composed of a start bit 20, a stop bit 21 and an information track area 31, but does not include a track number area. In the present embodiment, 144 information tracks 4 consecutive in a direction A are grouped as a block 32, and a plurality of such blocks 32 is arranged in the direction A to constitute a band 3. Though not illustrated, a plurality of such bands 3 is arranged in the direction C to constitute a recording area.

In each block 32, an end information track, the uppermost one in FIG. 12, constitutes a block identification area 33. In the present embodiment, said block identification area 33 is composed of a block mark 34a of 8 bits of consecutive same signals "1" or "0" block number area 35 of 8 bits, and a block mark 34b of 48 bits of consecutive same information signal. Consecutive same signals exceeding 8 bits does not appear except in said block identification area 33. However the structure of the block identification area is not limited to such embodiment, but satisfactory block identification can be achieved if the block marks 34a, 34b have consecutive same information bits of a suitable length longer than those existing outside the identification area 33. Also the block number area 35 is required to have a number of bits enough for identifying all the blocks in the band 3.

The information track area 31 of the track 4 is provided with an error correction area 36a. Also in the block 32, at an end opposite to the block identification area 33, or the lowermost end in FIG. 12, there is provided an error correction area 36b for correcting the errors in the block 32.

In the following there is explained an embodiment of the process for producing information from the above-explained information recording medium, wherein employed are an optical card as the recording medium of the recording format shown in FIG. 12, and the apparatus shown in FIG. 2 for reproducing information from said optical card.

At first the optical head 11 is moved in the direction C for access to a band containing a desired block. Then the optical card is moved in the direction A until the sensor array 10 of the optical head 11 detects eight consecutive bits of same information, or the block mark 34a, and a corresponding block number is detected from the succeeding block number area and is identified whether the detected block is the desired one. If the desired block is detected, the information is reproduced from the data area of said block. On the other hand, if the desired block is not detected, the information of the data area of said block is not reproduced, but the optical head is further moved in the direction A or C until a succeeding block mark is detected, and a similar procedure is thereafter repeated.

Also following operation is made possible by recording the block numbers of all the blocks as a list in all the blocks present in the recording medium, or by recording the block numbers of all the blocks in each band, and by providing the reproducing apparatus with suitable means for memorizing or calculating the relative positional relationship of the blocks.

Once a block identification area 33 of a certain block 32 is detected, the number of blocks and direction to the desired block can be determined. It is therefore rendered possible to increase the speed of movement of the optical head 11 and the optical card 1 to the desired block, thereby reducing the time of access to said desired block.

The detection of the desired block can also be achieved by counting, with a counter, the number of detections of the block marks 34a, 34b. Furthermore, this method may be combined with the detection of the block number in said block number area 35 to achieve securer detection of the desired block. In the foregoing embodiment, the block number area 35 records the block numbers with a number of bits enough for identifying all the blocks in the band 3. However said number of bits of the block umber area 35 may be reduced without sacrifying the precision of block detection by giving continuous numbers to the blocks in a band, and detecting the desired block through a combination with the above-mentioned counting of the block mark detections.

Also the foregoing embodiment can improve error correction since it can be doubly realized in the error correction area 36a in each track 4 and the error correction area 36b in each block.

Besides the present embodiment allows to reduce the increase in redundancy resulting from the presence of the error correction area, since the error correction area 36a can be relatively small since the error correction in the present embodiment need not be completed in each track, and the increase in redundancy due to the presence of the correction area 36b for the block is relatively small.

In the foregonig embodiment the identification area 33 is composed of a track, but it may be composed of plural tracks. At least one of the tracks constituting said area 33 is required to contain consecutive bits of same information longer than those appearing in other areas, so that the identification area 33 may be filled with same information bits. In such case the desired block can be identified by counting the number of such identification areas 33 as explained before. Furthermore the block mark 34b in the foregoing embodiment may be utilized as the data area.

Also the block in the foregoing embodiment is composed of 144 tracks, but it may be composed of a suitable number of tracks in consideration of the nature of the recorded information and the number of bits of the track number area.

Also this embodiment is applicable not only to the optical card but to any information recording medium having a recording area composed of the above-explained information tracks.

The recording format shown in FIG. 12 is not provided with the reference lines 202 shown in FIG. 4. However the presence of such reference line 202 is desirable for separating and identifying each information track 4 of the information track area 201 from the neighboring information track.

In the recording format shown in FIG. 12, the reference line may be formed in the track, between the start bit 20 and the information track of a neighboring band. Though not explained in the foregoing, the start bit 20 and the stop bit 21 respectively indicate the start and end of the recorded data in the information track 4, and said stop bit 21 can be detected by counting the number of clock pulses employed in the data reproduction of the information track 4.

FIG. 12 shows the recording format in the vicinity of a particular block 32 in a band. The format at the first track of said band may be constructed as shown in FIG. 4 to ensure high-speed access to said block 32.

Also as will be explained later, a directory area may be formed in a predetermined part of the recording medium having the recording format shown in FIG. 12 and may be utilized for recording the block numbers, start positions of blocks indicated by said numbers, data lengths of said blocks etc. A high-speed data reproduction is rendered possible by at first reproducing the information of said directory area and making access to a particular block according to thus reproduced information.

Figure 13:
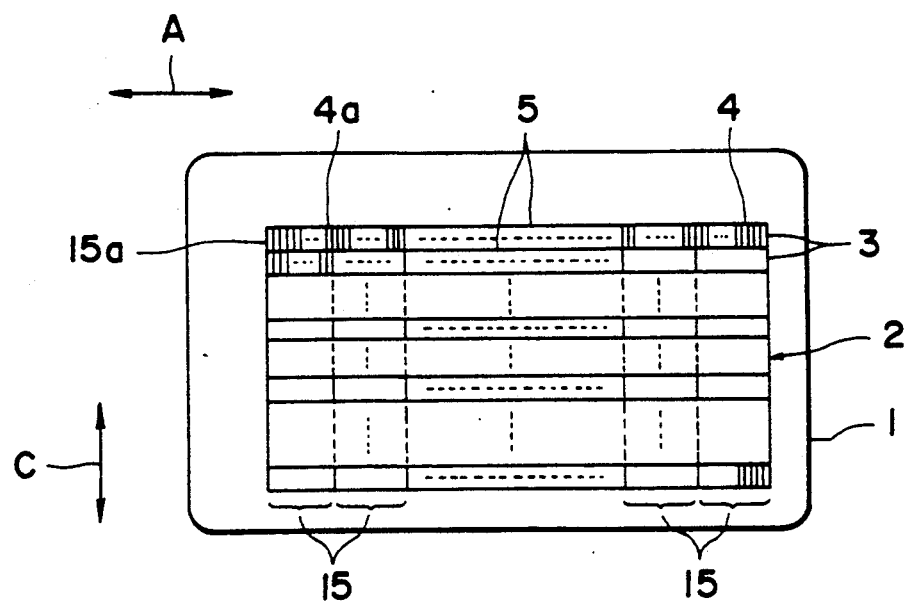
FIG. 13 is a schematic plan view of a recording format representing still another embodiment of the information recording medium of the present invention.
Figure 14:
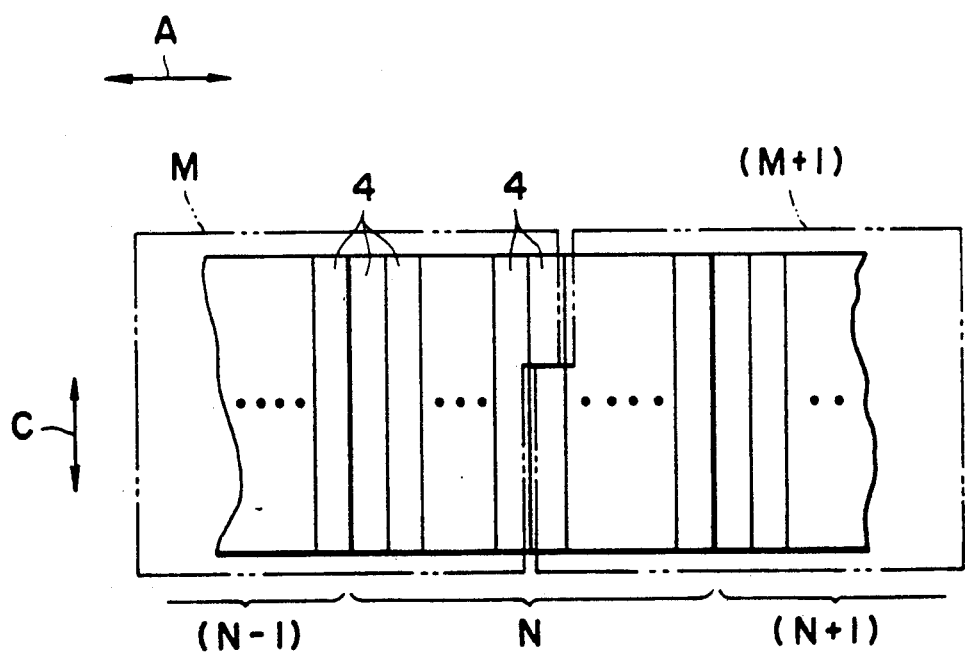
FIG. 14 is a partial enlarged view thereof.

FIG. 13 is a schematic plan view of a recording format representing still another embodiment of the information recording medium of the present invention, and FIG. 14 is a partial enlarged view thereof.

Figure 1:
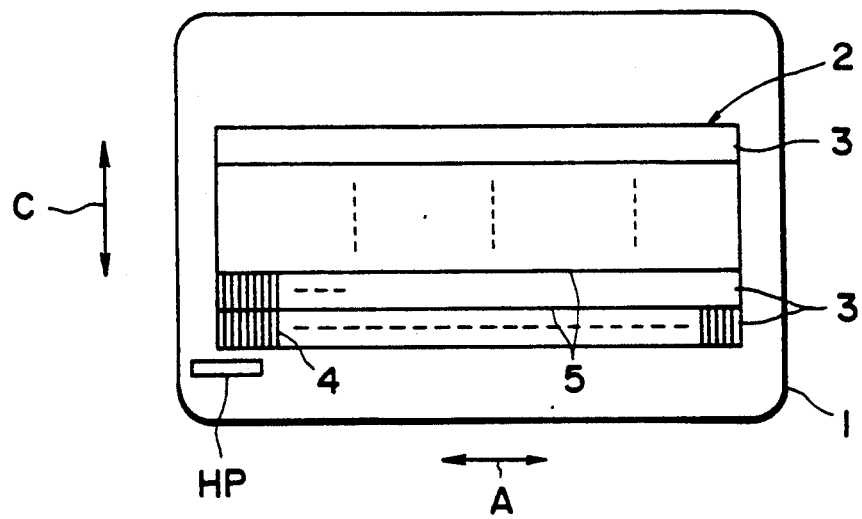
FIG. 1 is a schematic plan view of a recording format of an optical card.

In FIG. 13 there are shown an optical card 1, a recording area 2 thereof, a band 3, an information track, and a reference line 5, which are similar to those shown in FIG. 1. Consecutive plural information tracks 4 are grouped to constitute a block 15, and plural blocks 15 in the direction A constitute a band 3.

In the present embodiment, a first block 15a in a first band is utilized as the directory area, which records the names of all the data recorded in the recording area of said optical card 1, lengths of said data, block numbers and start positions of said blocks. A last track 4a of said directory area 15a is utilized as a home position (HP) mark. Each block other than said directory area 15a has a block number recorded, as address information, in respective first track thereof.

FIG. 14 shows, in magnified schematic manner, an (N−1)-th, N-th and (N+1)-th blocks in a certain band. In the illustrated example, an M-th data is terminated in the middle of a certain track 4 of the N-th block, and an (M+1)-th data immediately follows on said track. In this manner the recording area of the optical card 1 in the present embodiment has no bland portion and is fully utilized.

In the following there will be explained an embodiment of the process for information reproduction from said recording medium, wherein employed are an optical card as the information recording medium of the recording format shown in FIGS. 13 and 14, and the reproducing apparatus shown in FIG. 2, for reading information from said optical card.

At first the optical head 11 is moved in the direction C for access to the band 3 containing the directory area 15a. Then the optical card 1 is moved in the direction A to read the information of said directory area 15a and the home position mark 4a. Then, for example in case of making access to the (M+1)-th data, the optical head 11 is moved in the direction C while the optical card 1 is moved in the direction A to make an access to the start of the block N containing the start of said (M+1)-th data, and the optical card 1 is further moved in the direction A for access to the start of said (M+1)-th data, according to the information read from said directory area 15a. Said access from the start of the block N to the start of the (M+1)-th data is achieved by counting the number of scannings of the information tracks by the sensor array, or the number of information bits according to the number of clock pulses, since the distance from said directory area to the start of the (M+1)-th data is recorded.

The completion of reading of the (M+1)-th data is identified from the information on data length, obtained from the directory area 15a.

Figure 15:
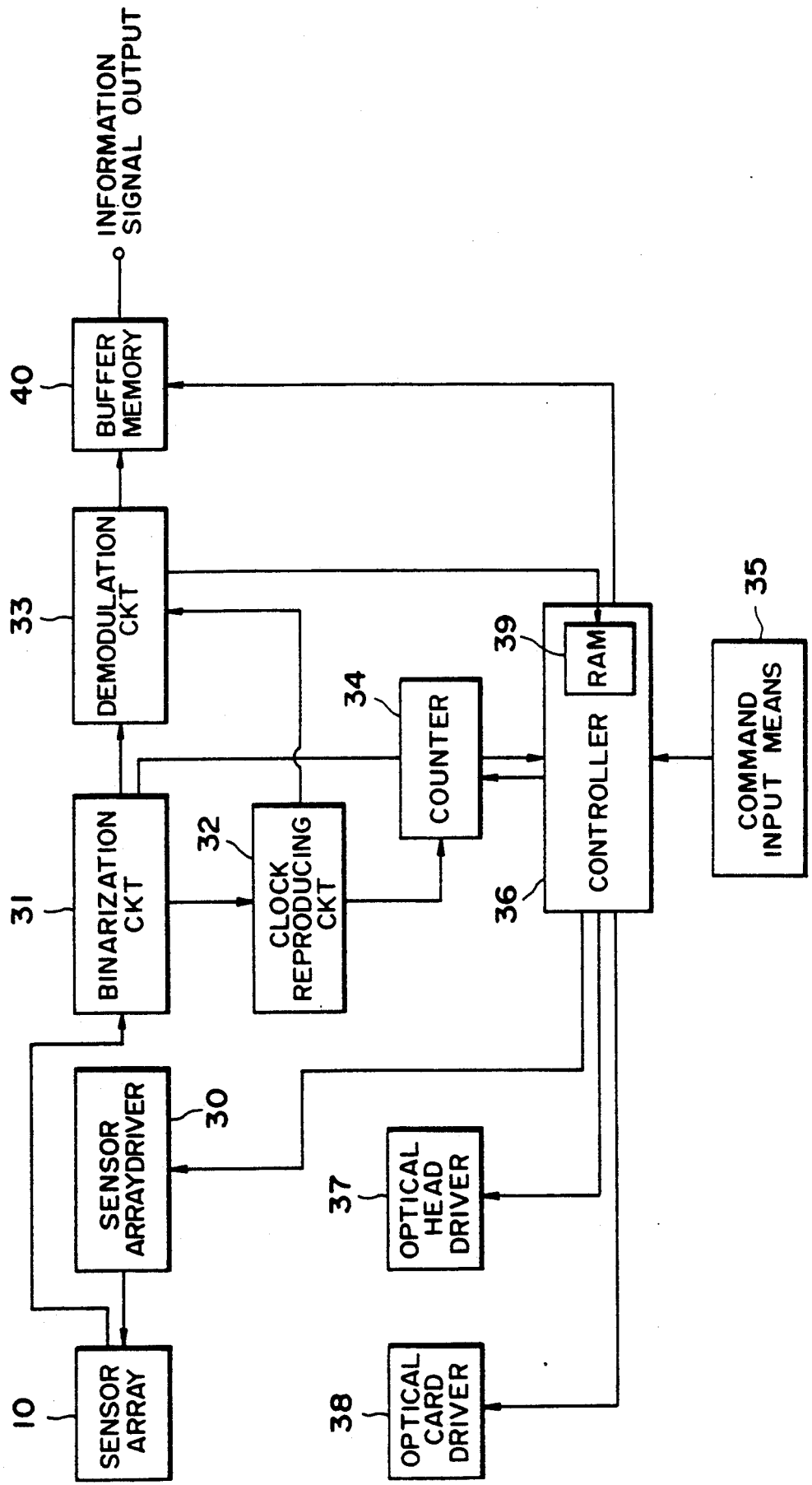
FIG. 15 is a block diagram showing an embodiment of the apparatus for reproducing information from the information recording medium of the present invention.

FIG. 15 is a block diagram showing an embodiment of the apparatus for reproducing information from the information recording medium of the present invention, and the above-explained reproducing function will be further clarified with reference to said block diagram.

The sensor array 10 of the optical head 11 is driven by a sensor array driver 30, scans the image of an information track imaged on the sensor array 10, and supplies the obtained signals to a binarizing circuit 31. The output signal thereof is supplied to a clock reproducing circuit 32 for regenerating the clock signal, which is supplied to a demodulating circuit 33 and a counter 34. The demodulating circuit 33 receives the information signal from the binarizing circuit 31 and demodulates said signal, according to the clock signal.

In response to a command for information reproduction supplied from input means 35, such as a keyboard, to a controller 36, a drive command is supplied therefrom to optical head drive means 37 and optical card drive means 38, whereby the optical head 11 makes an access to the directory area 15a of the optical card 1. Also the controller 36 supplies a drive command to a sensor array driver 30, thereby reading the information in said directory area 15a. The information signal of the area 15a obtained from the demodulating circuit 33 is stored in a RAM 39 of the controller 36.

Then, in response to the name of desired data entered from the input means 35, and according to the signal stored in the RAM 39, the optical head drive means 37 and the optical card drive means 38 are activated for making an access to the start of the desired data. Simultaneously the controller 3 supplies a count command for the data length of the desired data to the counter 34 according to the information stored in the RAM 39, whereby a counting operation is started simultaneous with the start of reproduction of the desired data. The desired data demodulated in the demodulating circuit 33 is stored in the buffer memory 40, and is released with an appropriate length according to an instruction of the controller 36 based on the data length counting of the counter 34. The information reading from the optical card 1 is not continuous but intermittent due to the reciprocating motion of the optical card 1, the buffer memory 40 is employed for obtaining a continuous output signal.

The foregoing embodiment enables efficient access operation with the optical head, since the directory area and the home position mark are formed in continuous manner.

In the foregoing embodiment, the directory area and the home position mark are formed in a block of the band, but they may also be provided in a position not continuous to the band.

Also the foregoing embodiment is applicable not only to the optical card mentioned above but also to any other recording medium having a recording area composed of tracks and bands as explained before.

In forming the information recording area with plural blocks as explained in FIGS. 12 to 15, the particularly information may be stored in each block as shown in FIG. 12, or over plural blocks as shown in FIG. 13.

In the recording format shown in FIG. 13, the blocks have a same data length, so that the plural blocks are formed by dividing equally the recording area. On the other hand, in the format shown in FIG. 12, the blocks have different data lengths and sizes as they record respectively different particular data.

If the different particular data to be recorded on the recording medium are not too much different in length, it is possible to divide the recording area into plural block of a same size enough for storing respective data, as shown in FIG. 13, to record said data respectively in said blocks and to fill the blank in each block with dummy data. In such structure, the start of particular data is always at the start of each block as in the format shown in FIG. 12, whereby a simple and high-speed access is enabled.

The recording format shown in FIG. 13 has the home position mark in the directory area as explained before, but said mark may be positioned separate from the directory area. However, the home position mark, functioning as a reference position for the optical head, should preferably be as close as possible to the directory area, in order to achieve high-speed reproduction.

Also for the data recorded in the information tracks of the formats shown in FIGS. 12 and 13, various modulations are applicable such as 4/5-NRZI; MFM or EFM, as in the recording medium shown in FIG. 4.

As explained in the foregoing, the use of an accurately identifiable block as the unit area for access allows to reduce or dispense with the track number area, thereby increasing the capacity of information storage, achieving a rapid access to a desired block, and enabling accurate and high-speed reproduction of the recorded information.

Also as explained in the foregoing, the use of recorded as the unit area for access and the exact access achieved through a block, based on the information recorded in the directory area, allow to reduce or dispense with the track number area and to eliminate blank areas, thereby increasing the capacity for information recording, achieving a further rapid access to the desired data, and enabling accurate and high-speed reproduction of the recorded information.

As detailedly explained above, the information recording medium of the present invention is provided with a recording area composed of information track groups each composed of plural information tracks, and identification areas respectively formed in said information track groups for indicating respective track groups, thereby reducing the redundancy such as the track numbers and increasing the amount of information recording.

Also the formation of a directory area for recording information on each information track group, such as the track numbers, positions of tracks, start positions of stored data, names of data, lengths of data etc. and the access to a particular information track group according to the information recorded in said directory area provide an information recording medium allowing accurate and high-speed reproduction of information.

Furthermore, the information reproducing process of the present invention enables exact reproduction of information with reduced errors in reading, since the data in said information track group is reproduced after the identification area of said group is read.

Also said identification area of the information track group can be utilized for the access to said group, thereby enabling high-speed access and accurate and high-speed reproduction of the recorded information.

In case the information recording medium has a recording area in which plural recording tracks, each consisting of a one-dimensional array of information bits, are arranged in a direction substantially perpendicular to the direction of said array, and a plurality of such information tracks is arranged in parallel manner in the direction of said array, the information track group, or a band, may be composed of plural information tracks which are arranged in said perpendicular direction. Also said band may be further divided into plural information track groups, or plural blocks, each provided with an identification area.

What we claim is:

1. An information recording medium comprising:
   a plurality of information tracks in which information is stored;
   a plurality of bands arranged in a first rectilinear direction and respectively separated from each other in the first rectilinear direction, each of the bands comprising a plurality of track groups arranged in a second rectilinear direction perpendicular to the first rectilinear direction, each of the track groups comprising a plurality of said information tracks arranged in said second rectilinear direction; and
   a plurality of identification areas each of which is formed by a part of the information tracks in each of said track groups and arranged at the end of each of said track groups in said second rectilinear direction, each of said identification areas including a code indicating the number of each of the track groups.

2. An information recording medium according to claim 1, wherein the code of each of said identification areas indicates one of the numbers serially assigned to all the track groups in said recording medium.

3. An information recording medium according to claim 1, wherein the code of each of said identification areas indicate one of the numbers serially assigned to all the track groups in each of the bands.

4. An information recording medium according to claim 1, wherein each of said identification areas includes an area having an array of information bits existing only in said identification areas.

5. An information recording medium according to claim 1, wherein each of said track groups includes an area for error correction.

6. An information recording medium according to claim 5, wherein each of some tracks of one of said track groups has an area for error correction.

7. An information recording medium comprising:
   a plurality of information tracks in which information is stored;
   a plurality of bands, each of which comprises a plurality of track groups arranged in a predetermined rectilinear direction, said bands being arranged in a rectilinear direction perpendicular to the predetermined rectilinear direction, each of the track groups comprising a plurality of said information tracks being arranged in the predetermined rectilinear direction; and
   a plurality of identification areas each of which is formed by selected ones of the plurality of information tracks in each of said track groups and arranged at the end of each of said track groups in the predetermined rectilinear direction, each of said identification areas including a code indicating the number of each of the track groups.

8. An information recording medium comprising:
   a plurality of information tracks in which information is stored;
   a plurality of bands arranged in a first rectilinear direction and respectively separated from each other in the first rectilinear direction, each of the bands comprising a plurality of track groups arranged in a second rectilinear direction perpendicular to the first rectilinear direction, each of the track groups comprising a plurality of the information tracks arranged in the second rectilinear direction; and
   a plurality of identification areas each of which is formed by a part of the information tracks in each of the track groups, each of the identification areas including a code indicating the number of each of the track groups.

9. An information recording medium according to claim 8, wherein the code of each of the identification areas indicates one of the numbers serially assigned to all the track groups in said recording medium.

10. An information recording medium according to claim 8, wherein the code of each of the identification areas indicates one of the numbers serially assigned to all the track groups in each of the bands.

11. An information recording medium according to claim 8, wherein each of the identification areas includes an area having an array of information bits existing only in the identification areas.

12. An information recording medium according to claim 8, wherein each of the track groups includes an area for error correction.

13. An information recording medium according to claim 8, wherein each of some tracks of one of the track groups has an area for error correction.

14. An information recording medium according to claim 8, wherein each of the identification areas is arranged at a leading position of the track group to which it belongs.

15. An information recording medium comprising:
   a plurality of information tracks in which information is stored;
   a plurality of bands arranged in a first rectilinear direction and respectively separated from each other in the first rectilinear direction, each of the bands comprising a plurality of track groups arranged in a second rectilinear direction perpendicular to the first rectilinear direction, each of the track groups comprising a plurality of the information tracks arranged in the second rectilinear direction; and a plurality of identification areas each of which is formed by information tracks selected in each of the track groups, each of said identification areas including a code indicating the number of each of the track groups.

16. An information recording medium according to claim 15, wherein each of the identification areas is arranged at a leading position of the track group to which it belongs.

* * * * *

UNITED STATES PATENT AND TRADEMARK OFFICE
CERTIFICATE OF CORRECTION

PATENT NO. : 5,233,598

DATED : August 3, 1993

INVENTOR(S) : HOSHI, ET AL.

Page 1 of 2

It is certified that error appears in the above-indentified patent and that said Letters Patent is hereby corrected as shown below:

On the title page, Item
[57] Abstract
    Line 2 of the Abstract, "with" should be deleted.

COLUMN 5
    Line 19, "tains" should read --tain--.

COLUMN 6
    Line 54, "optical" should read --optical card--.
    Line 68, "Circuit 314" should read --circuit 314 supplies--.

COLUMN 7
    Line 18, "NRZI 311" should read --NRZ1 signal 311--.

COLUMN 8
    Line 29, "properly" should read --properly forming--.

COLUMN 9
    Line 6, "band" should read --a band--.
    Line 40, "moles" should read --moves--.
    Line 56, "securer" should read --accurate--.

COLUMN 10
    Line 5, "utilizing" should read --utilized--.
    Line 44, ""O" block" should read --"O", a block--.
    Line 47, "does" should read --do--.

UNITED STATES PATENT AND TRADEMARK OFFICE
CERTIFICATE OF CORRECTION

PATENT NO. : 5,233,598
DATED : August 3, 1993
INVENTOR(S) : HOSHI, ET AL.

It is certified that error appears in the above-indentified patent and that said Letters Patent is hereby corrected as shown below:

COLUMN 11
    Line 16, "Also" should read --Also, the--.
    Line 35, "securer" should read --accurate--.
    Line 40, "sacrifying" should read --sacrificing--.
    Line 57, "foregonig" should read --foregoing--.

COLUMN 12
    Line 64, "bland" should read --band--.

COLUMN 14
    Line 17, "particularly" should read --particular--.
    Line 29, "block" should read --blocks--.
    Line 49, "to reduce or dispense" should read --the reducing or dispensing--.
    Line 54, delete "re-".
    Line 55, "corded" should read --an accurately identifiable block--.
    Line 57, "to reduce" should read --the reducing--.
    Line 58, "pense" should read --pensing--.

Signed and Sealed this

Twelfth Day of April, 1994

Attest:

BRUCE LEHMAN

*Attesting Officer*

*Commissioner of Patents and Trademarks*